June 11, 1940.     C. L. WILBER     2,204,287
AXLE HOUSING
Filed Dec. 29, 1936     3 Sheets-Sheet 1
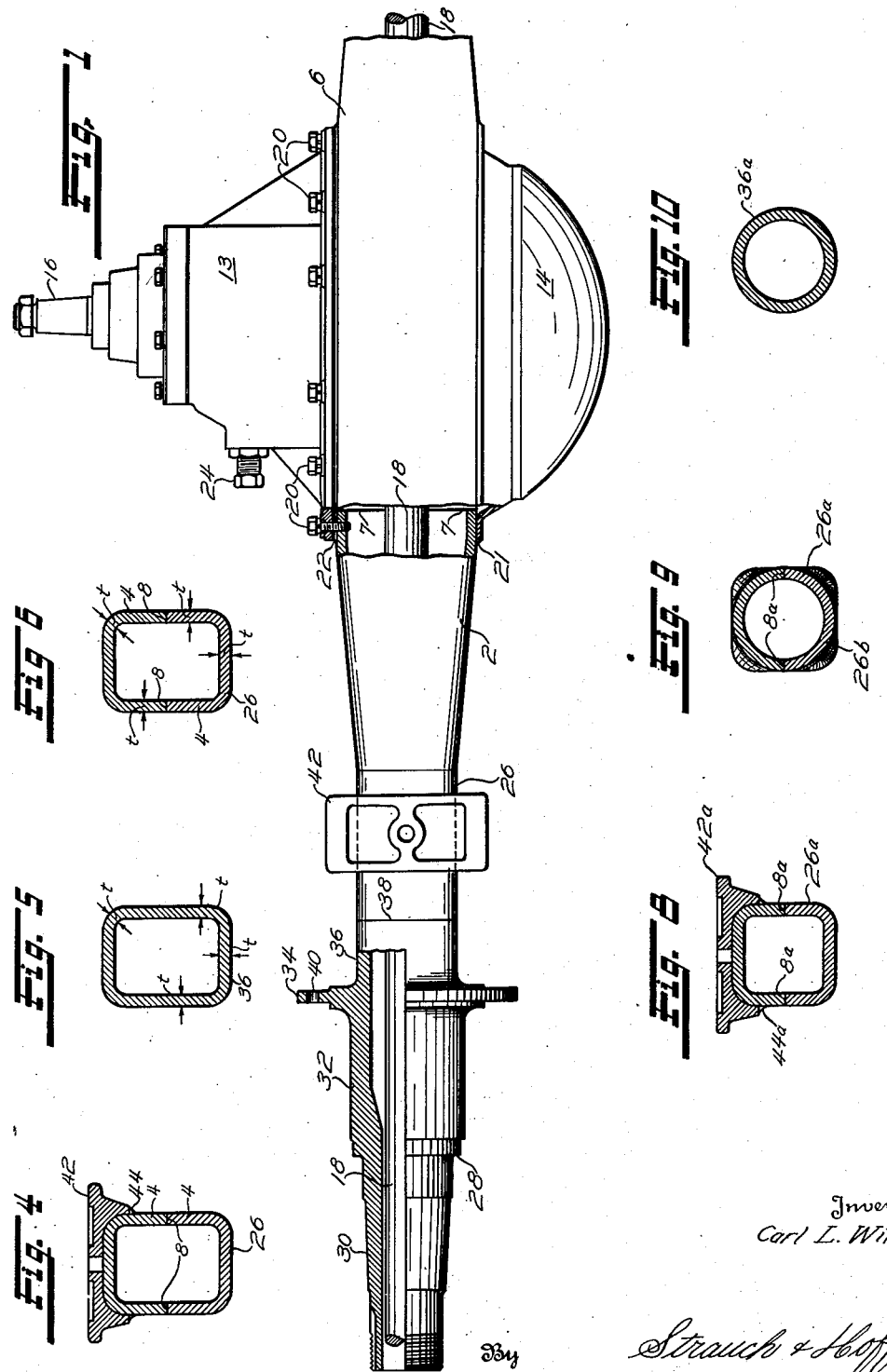
Inventor
Carl L. Wilber
By Strauch & Hoffman
Attorneys June 11, 1940.   C. L. WILBER   2,204,287
AXLE HOUSING
Filed Dec. 29, 1936   3 Sheets-Sheet 2
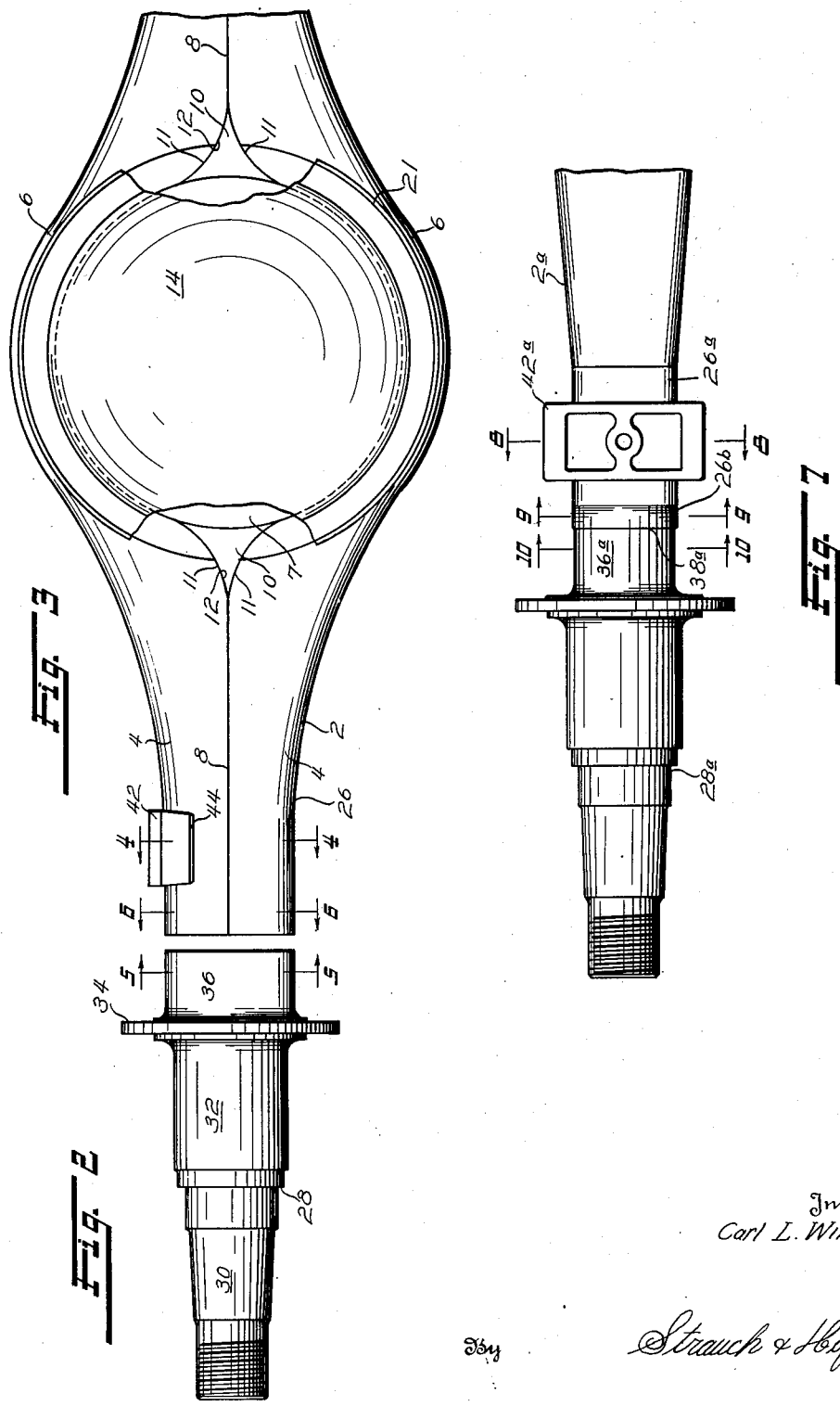
Inventor
Carl L. Wilber
By Strauch & Hoffman
Attorneys June 11, 1940.          C. L. WILBER          2,204,287
AXLE HOUSING
Filed Dec. 29, 1936          3 Sheets-Sheet 3
Fig. 11
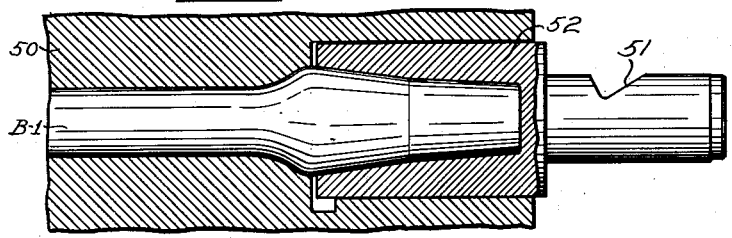
Fig. 12
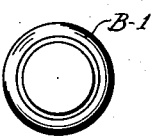
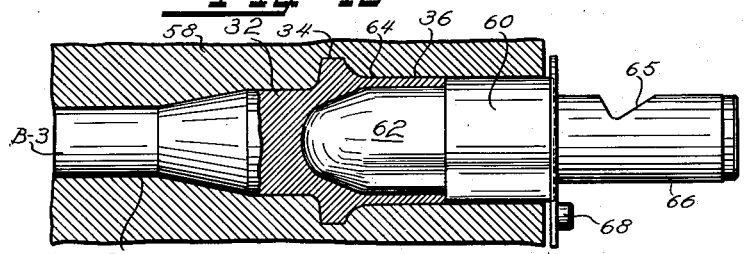
Fig. 14
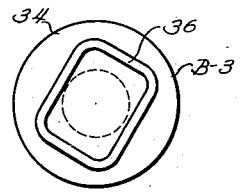
Fig. 13
Fig. 15
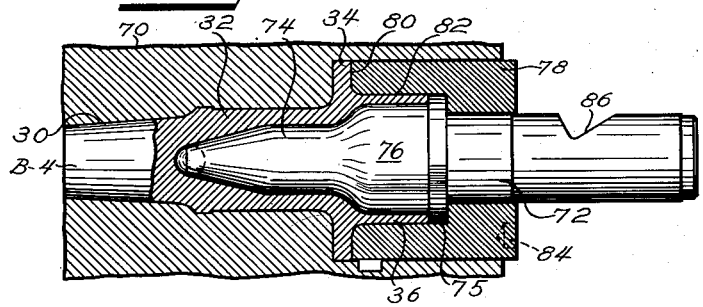
Fig. 16
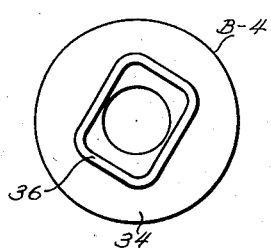
Fig. 17
Fig. 18
Inventor
Carl L. Wilber
By Strauch & Hoffman
Attorneys Patented June 11, 1940

2,204,287

UNITED STATES PATENT OFFICE 2,204,287

AXLE HOUSING

Carl L. Wilber, Detroit, Mich., assignor to The Timken-Detroit Axle Company, Detroit, Mich., a corporation of Ohio Application December 29, 1936, Serial No. 118,166

2 Claims. (Cl. 74—607)

This invention relates to axle housings of the type used to support the rear wheels of an automotive vehicle and to house the usual differential mechanism and driving axles through which power is transmitted to said wheels.

The patent to Alden No. 1,108,114 discloses a common construction of axle housings of this type which consists of two similar channel-shaped stampings, bowed at their mid-points, and welded together at their meeting edges. The relatively straight portions which extend from the enlarged portion at the center are circular in shape and carry at their outermost ends wheel spindles, which may be integrally formed therewith or separately made and secured to said ends. As is well understood the enlarged central portion or "banjo" provides a space for the differential mechanism and is closed by suitable cover members, one of which forms a support for the said differential mechanism. As is also well known the weight of the vehicle is supported through springs secured thereto and also to the axle housing by suitable clips.

In certain types of vehicle drives the vehicle springs constitute the sole means for resisting rotational movement of the axle housing caused by driving torque or braking action and in such installations great difficulty has been encountered in providing means for definitely anchoring the spring clips to the axle housing with sufficient rigidity to prevent slipping thereof. It has therefore been suggested to form portions of the axle housing of non-circular shape to insure a positive anchorage for the spring clips, which are shaped to conform to the housing. An increase in the transverse strength of the housing is also obtained by making the extended portions non-circular in shape. The present invention is primarily concerned with improvements in the construction of axle housings of the latter type wherein all the advantages present in these prior housings are retained and enhanced but at the same time greater strength, utmost simplicity of design involving a minimum number of parts, and ease of manufacture is obtained.

It is therefore a principal object of my invention to provide an improved axle housing which is characterized by maximum strength for the amount of material used, which is easy and economical to manufacture, and which is shaped to form a positive anchorage for the spring clips.

It is a further object of my invention to provide an axle housing in which the end portions, forming the wheel spindles and carrying the flanges for supporting the braking mechanism, are secured to the housing proper by means of a butt-weld whereby the joint therebetween is as strong, if not stronger, than the remaining portions of the housing assembly and expensive machining operations, usually necessary in the production and fitting of the parts, are obviated and the number of parts greatly reduced thereby simplifying the assembly process.

It is a still further object to provide an axle housing wherein a minimum amount of material is employed in the stampings forming the housing proper and wherein added strength is obtained by the use of gussets and a welded facing ring.

Another object of my invention is to provide increased strength in an axle housing by the use of a welded joint between the usual bowl or cover employed to close the enlarged opening in the housing adjacent to the differential mechanism.

In the manufacture of axle housings it is desirable, from a production standpoint, that the several parts be designed to permit ready variation of the trackage and of the distance between spring seats to accommodate the individual requirements of the trade in these respects.

It is therefore a still further object of this invention to provide an improved axle housing assembly embodying the aforementioned features and in which the several parts are so designed that housing assemblies of various sizes, as to trackage and spring seat spacing, may be readily fabricated from a few stock elements with a minimum of machining steps.

In the welding of abutting sections of generally tubular shape, it is requisite for a proper weld that the wall thickness of the abutting sections at the point of welding be uniform. In the present case little difficulty is encountered in this respect as far as the housing body is concerned. However, in the making of the spindle portions or spider elements, which are to be welded to the housing body, great care has to be exercised to insure that the tubular extensions of these spindle portions are of a uniform wall thickness. When the abutting sections are round a fair degree of accuracy and uniformity of wall thickness can be obtained with the usual forging operations. This is not the case, however, where the abutting tubular sections are non-circular in cross-section.

It is therefore a still further object of this invention to provide an improved method, and apparatus for carrying out the same, for forging the spindle forming portions of the axle housing whereby absolute uniformity of wall thickness throughout the entire extent of the tubular projections, carried by said portions, and exact matching of the same with the corresponding portions of the housing body is insured regardless of the shape of these portions.

The above and further objects will become apparent from a study of the following detailed description thereof and the appended claims taken in conjunction with the accompanying drawings, wherein Figure 1 is a top view of a preferred embodiment of my invention, with certain parts in section to show the interior construction thereof, and with one end broken away.

Figure 2 is a rear elevation of the wheel spindle element forming a part of my improved axle housing assembly.

Figure 3 is a rear elevation of the housing portion of said assembly, with portions of the bowl broken away and with drive axles and differential removed.

Figures 4, 5 and 6 are cross-sectional views taken on the lines 4—4, 5—5 and 6—6 of Figures 2 and 3, looking in the direction of the arrows.

Figure 7 is a top view of a portion of a modified form of axle housing assembly embodying my invention.

Figures 8, 9 and 10 are sectional views taken on the lines 8—8, 9—9 and 10—10 of Figure 7, looking in the directions of the arrows, but with certain elements, that would normally appear behind said sections, omitted for simplicity of disclosure.

Figures 11 to 18 are schematic views showing the several steps employed in my novel method of forging the wheel spindle or brake-spider element and also showing the novel apparatus used in said process, Figures 11, 13, 15 and 17 showing the actual forging steps, while Figures 12, 14, 16, and 18 are end views of the blank in its several stages of manufacture.

With continued reference to the drawings wherein like reference characters are employed to designate the same elements wherever they occur and with particular attention to Figures 1 to 6, my improved axle housing assembly consists of a body section 2 of generally elongated shape and formed of two opposed channel-like members 4—4 which are bowed at their midsections to provide an enlargement or "banjo" 6, open at both front and back. These channel-like members are U-shaped and welded together along their meeting edges, as shown at 8. In order to render the openings 7 occasioned by the bowed sections circular in shape without the use of an excessive amount of metal in the channel-like members, which are usually formed of stamped metal, suitable reinforcing elements or gussets 10 are welded at 11—11 in the angular space 12 caused by the bowing of these channel members 4—4. These gusset plates also strengthen the housing body section 2.

Covers members 13 and 14 are secured to the open faces of the enlarged or "banjo" section and the former serves as a carrier or supporting element for the differential mechanism, not shown, which transmits power from the shaft 16 to the drive axles 18—18 in a manner well known in the art. The cover element 13 is secured to one face of the "banjo" section by suitable bolts 20—20 which project through a facing ring 22 welded around its entire periphery to said face. The other cover element or bowl 14 is welded directly to the opposite face of the "banjo" section as shown at 21 in the cut-away section of Figure 1. The numeral 24 designates an adjusting screw utilized in adjusting a differential ring gear thrust element, not shown.

As the housing assembly is, of course, symmetrical about a transverse vertical plane through the center of the "banjo" section the disclosure and description is limited to one side thereof, it being understood that the other side is in all respects identical thereto.

End sections 26 which extend from each side of the "banjo" section are of uniform section adjacent their outer ends as will be evident from an inspection of Figures 4, 5 and 6 and are likewise seen to be generally rectangular in cross-section. Secured to the outer end of each of these extended portions 26 is a wheel spindle or brake spider element 28. This element consists of a wheel supporting section 30, a tubular portion 32, a radially extending flange 34 and an axially directed tubular flange 36. If desired the flange 34 may be separately made and secured to the spindle element 28, at the desired point, by welding or other suitable means. As will be apparent from Figures 5 and 6 the flange 36 is rectangular in shape and the same is also of the same dimensions as the rectangular shaped end section 26 so that the two exactly match when brought into abutting relationship. In Figure 1 these abutting edges are shown butt-welded together at 38 while Figures 2 and 3 show them slightly spaced prior to the welding operation.

In actual use suitable bearing members, not shown, are of course secured to the wheel supporting section 30 while brake-operating mechanism, also not shown, is secured to the flange 34 by securing means extending through the holes 40. A spring clip 42, shaped to conform to the non-circular shape of the end sections 26—26, is secured thereto by welding 44 or other suitable means.

In the fabrication of my improved axle housing assembly the body section 2 is first formed by welding the two channel members 4—4 together, then the reinforcing elements or gussets 10 are welded in place and the cover member 14 and facing ring 22 secured to the open faces of the "banjo" section 6. Next the spindle or spider elements 28 are butt-welded to the ends of the extending portions 26—26 of the housing assembly preferably by electric welding and lastly the drive axles and differential mechanism with the cover member 12 are assembled. The spring clips 42 are preferably welded to the housing just prior to the welding of the spindle elements 28—28 to the body section.

An important feature of my invention is the ease with which housing assemblies of various wheel trackage and spring seat spacing may be produced. As before stated, the tubular section 26 is of uniform size for a considerable distance inwardly of its outer extremity. In practice the housing body section is made of an overall length equal to the maximum trade requirements. It is therefore only necessary to cut-off a sufficient amount from the extremities of the end portions 26—26 and assemble the spindle elements 28—28 thereon, in the manner described, to obtain any particular desired wheel trackage. Then the spring clips 42—42 are welded to the housing body with the required spacing. In this manner a great variety of housing assemblies having different wheel trackage and spring clip spacing can be fabricated from single stock sizes of body section, the same size spindle element and spring clip being used in all cases. This greatly cuts down the number of dies and tools required and consequently lessens the expense involved.

It will, of course, be understood that either the flanges 36 and/or the end sections 26—26 are initially longer than necessary for the finished length to allow for the very slight shortening due to the welding step. Also the rib which is formed at the joint 38, in welding, may be left in place, to contribute whatever strength it may to the finished assembly, or may be ground off, as shown, to improve the exterior appearance thereof. However, the careful matching of the abutting sections of the spindle 28 and end section 26, both as to shape and wall thickness, makes it possible to obtain a very strong weld at this point, thus doing away with the necessity of any extra metal at this point.

My improved axle housing is unusually strong, due to the rectangular cross-section of the portions extending from the "banjo" section to the wheel spindles, and also to the strength of the welded joints utilized in assembling the several parts. The strength of the same is also greatly enhanced by the use of the welded gusset plates 10, while at the same time the stamping process employed to form the channel members 4—4 is made easier because of the consequent reduction in the amount of metal being stamped. The welding of the bowl 14 to the "banjo" section adds greatly to the transverse rigidity of the assembly as does the welded ring 22. Due to the non-circular shape of the housing body at the point of attachment of the spring clips, and the corresponding shape of said clips, a very firm and secure anchorage therefor is assured.

Thus it is seen that my novel axle housing embodies all the advantages of prior devices and has the added advantages of increased strength, simplicity of design and ease of manufacture as well as lending itself to the production of housings of various trackages and spring clip spacings with a minimum number of stock parts. The finished appearance of my axle housing is that of a one-piece element and by virtue of the welded joints its strength is equivalent thereto.

In Figures 7, 8, 9, and 10 a modified form of axle housing embodying certain of the foregoing features is shown. This form differs from the preferred form just described in only one respect, i. e. the shape of the tubular flange on the spindle element and the cross-sectional shape of the extreme end of the housing body section. As the structural details of this modified form are exactly the same as those of the preferred form, Figure 7 shows only a portion of the housing assembly adjacent the end thereof.

A body section 2a, which is composed of two channel members welded together at 8a in the same manner as section 2, Figure 7, has extending end portions 26a—26a, only one of which is shown, which are of rectangular cross-section for substantially their entire extent, see Figure 8. However, immediately adjacent the outer end of portion 26a the rectangular section is necked down to a circular section 26b, as shown in Figure 9. The axially extending flange 36a of spindle element 28a is likewise of circular section, see Figure 10, and exactly matches the aforementioned end section of portion 26a. This exact matching is required for the obtaining of a good weld at point 38a where these two elements are joined by butt-welding in the same manner as elements 28 and 26 of the embodiment shown in Figures 1, 2 and 3.

Spring clips 42a are secured to the section 26a by welding at 44a, in the same manner as set forth in the above description of the first embodiment.

Due to the rectangular cross-section of the extending portions 26a—26a, the desired spring clip anchorage is obtained and also since this rectangular shape extends for the major portion of the length of these portions, the transverse strength of the housing is increased. This form does not, of course, lend itself as readily to the production of housing assemblies of various wheel trackage, as is the case of the first described embodiment, but does embody all the other desirable features of said embodiment.

In both embodiments the utmost simplicity of design is present as well as the maximum of strength due to the welded joints, the gussets and the welding of the bowl member and facing ring to the open faces of the "banjo" section and also resulting from the rectangular section of the housing. In both embodiments a minimum number of parts are employed and the finished axle housing has the strength and appearance of a one-piece element.

As previously noted the brake spider or spindle element 28 is secured to the end section 26 by means of a butt-weld and a very important feature of my invention resides in the forming of the tubular flange 36 and the end section 26 of exactly matching cross-sectional shape. In order that the best weld possible be obtained it is necessary that the abutting sections of elements 26 and 36 not only match as to shape but also that these tubular sections be of the same wall thickness and that this wall thickness be of uniform value around the entire periphery of these tubular sections. In other words the dimensions indicated by $t-t$ in Figures 5 and 6 must be identical. This requirement results from the fact that an even heating of the metal is necessary to obtain a good weld and since these sections are butt-welded a variation in the thickness of the metal will cause uneven heating.

This condition is obtained without great difficulty in the housing member section 26 by controlling the size and shape of the dies used in stamping the channel-like members 4—4. However, a real problem is presented in forming the tubular flange 36 of the spider or spindle element 28 to the desired shape and size, especially as the same is of rectangular shape as shown in Figures 1 to 6, and important aspects of this invention are the method and means employed to forge the spindle element and obtain this desired result.

Referring now to Figures 11 to 18, these aspects of the invention are disclosed. The forging process is carried out in a series of steps illustrated in Figures 11, 13, 15 and 17 and is as follows: Starting with a piece of round bar stock the same is first upset to the cone-shape B—1, Figure 11, by means of the die 50 and the upsetting tool 52 operated by a means, not shown, keyed to the tool 52 at 51. It will be understood that in this step, as in those following, a suitable stop means is employed to prevent axial movement of the blank in the exterior die member. A forging machine that is conventional, except for novel punch and die elements hereafter described, is used throughout this entire process. Next the blank is placed in die 54 and further upset or shaped to the form B—2, Figure 13, by the tool 56 operated by a means, not shown, keyed to the tool at 55. At this stage the enlarged end of the blank B—2 is rectangular in cross-section as shown by Figure 14, which is an end elevation of the blank looking towards the said enlarged end. After the first step the enlarged end is conical as will be seen from Figure 12, an end elevation of the blank B—1.

In the third step a combined punching and shaping process is carried out by means of die 58 and punch 60. In this step the flange 34 is partially formed and the tubular flange 36 initially shaped, also the tubular portion 32 and wheel bearing section 30 begin to take shape. Figure 15 shows this step while Figure 16 shows an end elevation of the blank B—3. It is very important at this stage of the process that the walls of the extension 36 be of uniform thickness throughout the entire periphery thereof. This result is obtained by exactly positioning the leading end 62 of the punch 60 in proper angular relationship with the die 58. The portion 64 of die 58 is rectangular in shape and the leading end 62 is of similar shape but slightly smaller in size to produce the tubular section 36. It is obvious that if the punch 60 rotates, even a slight amount, with respect to die 58 that a tubular section of uniform wall thickness will not be obtained. To obviate such rotation the shank 66 of punch 60 is provided with a key or pin member 68 which is received in a recess in the punch operating means, not shown, but which is also keyed to the punch at keyway 65. The punch operating means is held against rotation with respect to the die 58 and by suitably correlating the pin 68 with respect to the leading end 62 and the rectangular portion 64 of the die 58, the proper angular relationship between the leading end and the die is absolutely maintained and uniformity in the wall thickness of the tubular flange 36 results.

In the final step of my improved process a combined extruding, shaping and punching process is carried out as illustrated in Figure 17; Figure 18 showing an end elevation of the finished blank B—4. A die 70 is shaped to give the proper exterior rough shape to the portions 30, 32 and a side and edge of the flange 34 of the spider element, while a punch 72 continues the punching process of the former step. Carried by the shank of punch 72 is a movable die or ring member 78. In operation the punch operating means, not shown, abuts the outer end of the die 78 and is provided with a pin snugly fitting in the recess 84. This operating means is also keyed to the shank 72 at the keyway 86. As the operating means cannot rotate with respect to the die 70 it will be seen that the punch 72, ring 78 and die 70 are all maintained in fixed angular relationship.

The portion 74 of the leading end of punch 72 is tapering and of circular section to form the tubular section 32 while the portion 76 is of rectangular shape and cooperates with portion 82 of the movable die 78, which is also of rectangular shape, to finish the tubular portion 36. The end 80 of movable die 78 finishes the front face of flange 34. In this last step the linear extent of flange 36 is decreased while the radial extent of the flange 34 is increased and extruded between the die 70 and end 80 of die 78. A rib 75, on punch 72, determines the finished length of the flange 36. Since the rectangular portion 76 is held during these steps in proper angular relation to the portion 82 of die 78, absolute uniformity in the wall thickness of flange 36 is assured even though the whole punch and die assembly 72—78 does move slightly in respect to die 70. The flange 36 is readily formed between the opposed surfaces 76 and 82. The real problem is to hold these surfaces in proper position, and this is simply done when accomplished as above described. The nature of this last step is such as to remove any inaccuracies of the preceding step where the punch 60 may possibly move out of exact alignment with the die 58, or possibly rotate slightly with respect thereto. An added advantage of the combined punch and die set up used in this last step resides in the fact that when the die 78 becomes worn it may be readily removed from the punch 72 and replaced by a new die.

If desired the last step may be carried out in two stages, with two complete sets of die and combined punch and die similar to those shown in Figure 17, but of progressively varying sizes, to lessen the amount of metal working in each stage, thus decreasing the wear on the punches and dies.

By the foregoing novel forging process, utilizing in the last step my improved combined punch and movable die, it is possible to economically produce the spider element 28 with a minimum number of steps and with a final step which assures absolute uniformity of wall thickness in the tubular flange which is to be joined to the housing section by butt-welding. It will be understood that portions of the blank B—4 are suitably machined to the finished shape, as shown in Figures 1 and 2, subsequent to the last forging step above described. However, no machining is required on the flange 36 which is finished to size in the last forging step.

It will also be evident that my improved process and apparatus, while especially adapted to the production of spindle elements wherein the end flange is of rectangular section causing great difficulty in the regulation of wall thickness thereof, may be used in the production of spider elements of the type shown in Figure 7, and having end flanges 36a of circular section. In this event the portions 62—64 of punch 60 and die 58, and the portions 76—82 of punch 72 and die 78, will of course be circular in section. By virtue of the novel punch and movable die used in the last step of my improved process, absolute uniformity will likewise be obtained in the tubular flange portion. Although a slight rotation of the punch with respect to the die, in the third or last steps, will not be as serious in the case of a circular flange, it will produce inaccuracies in wall thickness and the same will also be produced by misalignment of punch and die. These are all removed by the final step of my process as above explained. Hence it is seen that my improved process and punch and die assembly have great utility in the formation of end flanges of any desired shape where uniformity of wall thickness is essential.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An axle housing comprising a body portion having a mid-section and tubular portions of substantially rectangular cross-section extending therefrom; spindle elements having axially directed tubular flanges matching said rectangular portions and joined to the outer ends of said portions by means of butt-welds; the wall thicknesses of tubular flanges and said tubular extending portions being substantially equal and uniform around the entire peripheries thereof; spring clips shaped to conform to the outer surface of said tubular portions and secured thereto; said tubular portions being of substantially uniform size and shape throughout a part of their entire length, whereby said clips may be positioned at any desired point thereon to vary the spacing thereof and whereby said spindle elements may be selectively located with respect to said mid-section, to vary the overall length of the housing, by severing portions of said tubular portions and butt-welding said spindle elements to said severed ends.

2. An axle housing comprising a body portion having a mid-section and tubular extending portions of substantially rectangular cross-section at opposite ends thereof; spindle elements having axially directed tubular flanges matching said rectangular tubular portions and joined to the outer end of said portion by means of butt-welds; the wall thicknesses of said tubular flanges and said tubular extending portions being substantially equal and uniform around the entire peripheries thereof; said tubular portions being of substantially uniform size and shape throughout a part of their entire length, whereby said spindle elements may be selectively located with respect to said mid-section, to vary the overall length of the axle, by severed portions of said tubular portions and butt-welding said spindle elements to said severed ends.

CARL L. WILBER.